United States Patent [19] [11] Patent Number: 4,651,776
Nakano et al. [45] Date of Patent: Mar. 24, 1987

[54] FLUID PRESSURE CONTROL VALVE FOR HYDRAULIC ACTUATOR

[75] Inventors: Masaki Nakano, Kawasaki; Sigeaki Yamamuro, Zushi; Hiroyuki Hirano, Yokohama; Keiju Abo, Yokosuka; Haruyoshi Kumura, Yokohama, all of Japan

[73] Assignee: Nissan Motor Co., Ltd., Yokohama, Japan

[21] Appl. No.: 835,099

[22] Filed: Feb. 28, 1986

[30] Foreign Application Priority Data

Mar. 6, 1985 [JP] Japan .................................. 60-42882

[51] Int. Cl.⁴ .......................... F15B 13/04; F16K 3/24
[52] U.S. Cl. ............................. 137/625.69; 137/625.3; 251/324; 474/28
[58] Field of Search ......................... 137/625.3, 625.69; 251/324; 474/28

[56] References Cited

U.S. PATENT DOCUMENTS 3,971,216  7/1976  Miller ........................ 137/596.13 X
4,313,467  2/1982  Lang ................................. 137/625.3
4,371,002  2/1983  Tischer ............................. 137/625.3
4,533,340  8/1985  Abo et al. ............................. 474/28

FOREIGN PATENT DOCUMENTS

1011751 12/1965 United Kingdom .......... 137/625.69

Primary Examiner—Gerald A. Michalsky
Attorney, Agent, or Firm—Schwartz, Jeffery, Schwaab, Mack, Blumenthal & Evans

[57] ABSTRACT

A fluid pressure control valve for a hydraulic actuator has a valve body having a valve bore and a fluid port for discharging a fluid toward the hydraulic actuator, and a spool slidably received in the valve bore. The spool has a cylindrical spool section slidably fitted in the valve bore for closing the fluid port and a tapered spool section having a conical shape for opening the fluid port through annular open clearance of a variable area between the concial surface of the spool and the cylindrical surface of the valve bore. Between the cylindrical ad tapered spool sections, there is formed an annular groove or an annular face forming a step for preventing particles of dust suspended in the fluid from being bitten between the tapered spool section and the cylindrical surface of the valve bore by traping the particles. Furthermore, a radial groove is formed in a side wall of the fluid port in order to prevent a sudden change in the opening area which would be otherwise caused by an abrupt change of the spool contour due to the annular groove or the annular face.

7 Claims, 11 Drawing Figures

FLUID PRESSURE CONTROL VALVE FOR HYDRAULIC ACTUATOR

BACKGROUND OF THE INVENTION

The present invention relates to a control valve for controlling a fluid pressure supplied to a hydraulic actuator.

For example, a V belt type continously variable transmission is arranged to control a transmission ratio (gear ratio) by controlling a fluid pressure in a cylinder chamber of a hydraulic actuator for moving a pulley, so that a fluid pressure control valve is required.

A Japanese patent provisional publication No. 59-77155, which corresponds to U.S. Pat. No. 4,533,340 and European patent application No. 83 110 544.0, discloses one example of a fluid pressure control valve for controlling a transmission ratio of a V belt type transmission. This control valve utilizes a spool whose land is tapered at one end so as to form a conical shape. An oil flows through a restricted annular clearance formed between an inwardly facing cylindrical surface of a valve bore and an outwardly facing conical surface of the spool.

However, this control valve is unsatisfactory in that particles of dust or the like suspended in the oil are easily caught between the conical surface of the spool and the cylindrical surface of the bore, and therefore the spool is easily stuck by the particles.

SUMMARY OF THE INVENTION

It is an object of the invention to provide a fluid pressure control valve of a type having a tapered spool which is not easily affected by particles of dust suspended in a fluid, and which has a smooth fluid pressure control characteristic.

According to the present invention, a control valve for a hydraulic actuator has at least a valve body and a spool. The valve body has at least first and second wall sections, a valve bore passing through the first and second wall sections, and first, second and third fluid ports opening to the valve bore. The first port is formed between the first and second wall section for conveying a fluid from the valve bore to the hydraulic actuator. The second port is for receiving the fluid from a fluid pressure source into the valve bore. The third port is for draining the fluid from the valve bore. The first wall section is situated between the first and second ports. The second wall section is situated between the first and third ports. The first wall section has a first side face which constitutes the boundary between the first wall section and the first port. The first side face of the first wall section is formed with a radial groove extending into the valve bore. The spool is slidably received in the valve bore of the valve body. The spool has at least a cylindrical spool section slidably fitted in the valve bore, a taper spool section, and a trap means. The taper spool section is situated on an upstream side of the cylindrical spool section in an upstream direction pointing from the first port toward the second port. The sectional area of the taper spool section decreases gradually in the upstream direction. The trap means is formed between the cylindrical section and taper section for forming a step.

DETAILED DESCRIPTION OF THE INVENTION

Figure 3:
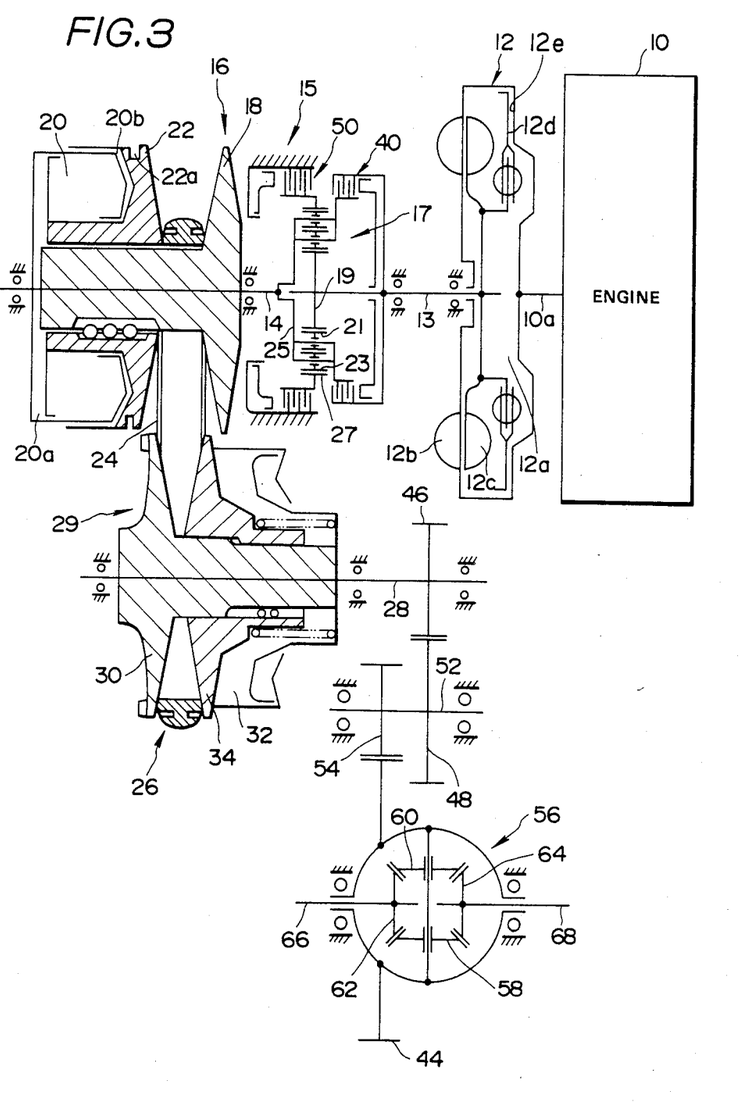
FIG. 3 is a schematic illustration of a power transmitting mechanism including a continuously variable transmission having a hydraulic actuator controlled by the control valve of FIG. 1, FIGS. 4A and 4B are a view of a hydraulic circuit including the control valve of FIG. 1.

FIG. 3 shows a mechanism for transmitting power from an engine 10. This mechanism includes a hydrodynamic drive 12 in the form of a fluid coupling, a forward-reverse change-over mechanism 15, a countinuously variable V belt transmission 29, and a differential 56. This power transmitting mechanism can transmit rotation of an output shaft 10a of the engine 10 to output shafts 66 and 68 while controlling a ratio between input and output speeds and selecting a rotational direction of the output shafts 66 and 68. The fluid coupling 12 has a lock-up oil chamber 12a, a pump impeller 12b, a turbine runner 12c and so forth. The fluid coupling 12 is connected with the forward-reverse change-over mechanism 15 by a rotation shaft 13. The change-over mechanism 15 has a planetary gearing 17, a forward clutch 40 and a reverse brake 50. The planetary gearing 17 has a sun gear 19, pinion gears 21 and 23, a pinion carrier 25 and an internal (ring) gear 27. The change-over mechanism 15 is connected to a driver pulley 16 of the V belt transmission 29 by a driver shaft 14. The driver pulley 16 has a stationary conical disk 18, a driver pulley cylinder chamber 20 (chambers 20a and 20b), a movable conical disk 22 and a groove 22a. The driver pulley 16 is connected to a follower pulley 26 by a V belt 24. The follower pulley 26 has a stationary conical disk 30, a follower pulley cylinder chamber 32 and a movable conical disk 34. The follower pulley 26 is connected to the differential 56 through a follower shaft 28, a drive gear 46, an idler gear 48, and idler shaft 52, a pinion gear 54 and a final gear 44. The differential 56 has pinion gears 58 and 60, side gears 62 and 64 which are connected with the output shafts 66 and 68. This power transmitting mechanism is disclosed in more detail in a copending U.S. patent application Ser. No. 792,422, filed Oct. 29, 1985, and a corresponding European patent application No. 85 113 788.5, filed Oct. 29, 1985, whose disclosure is hereby incorporated by reference.

Figure 4A:
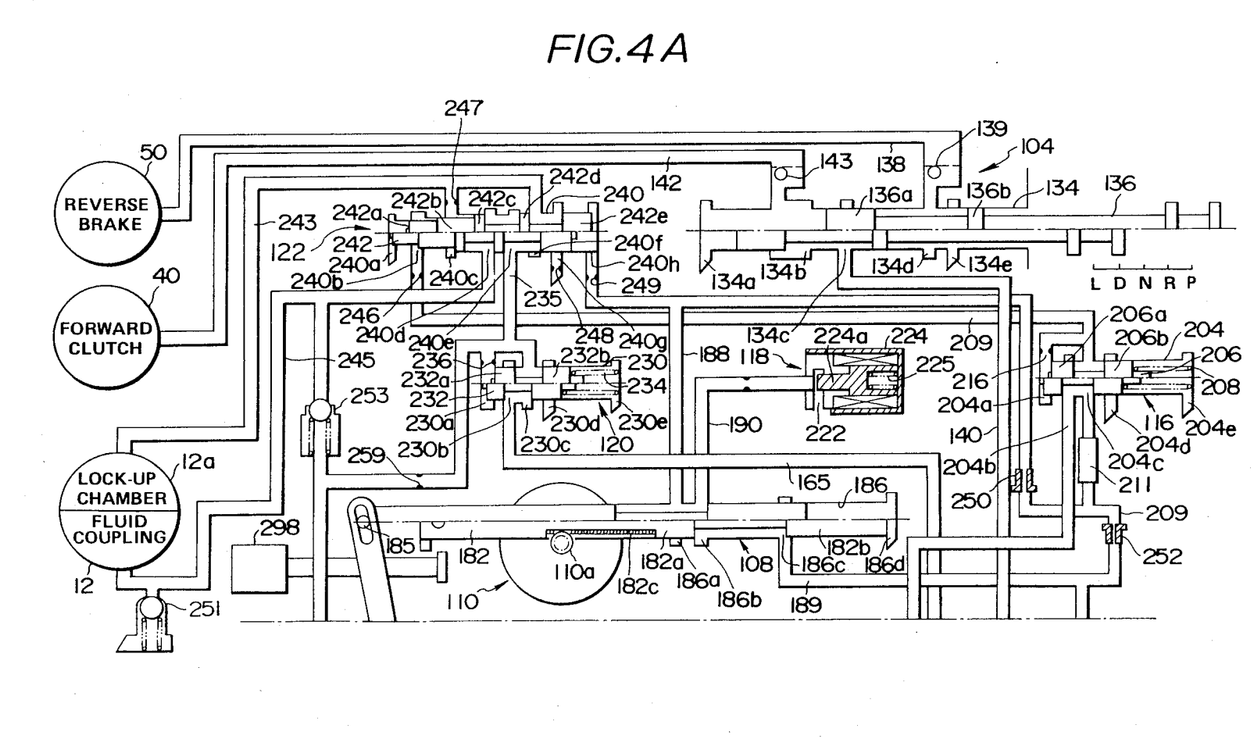
Figure 4B:
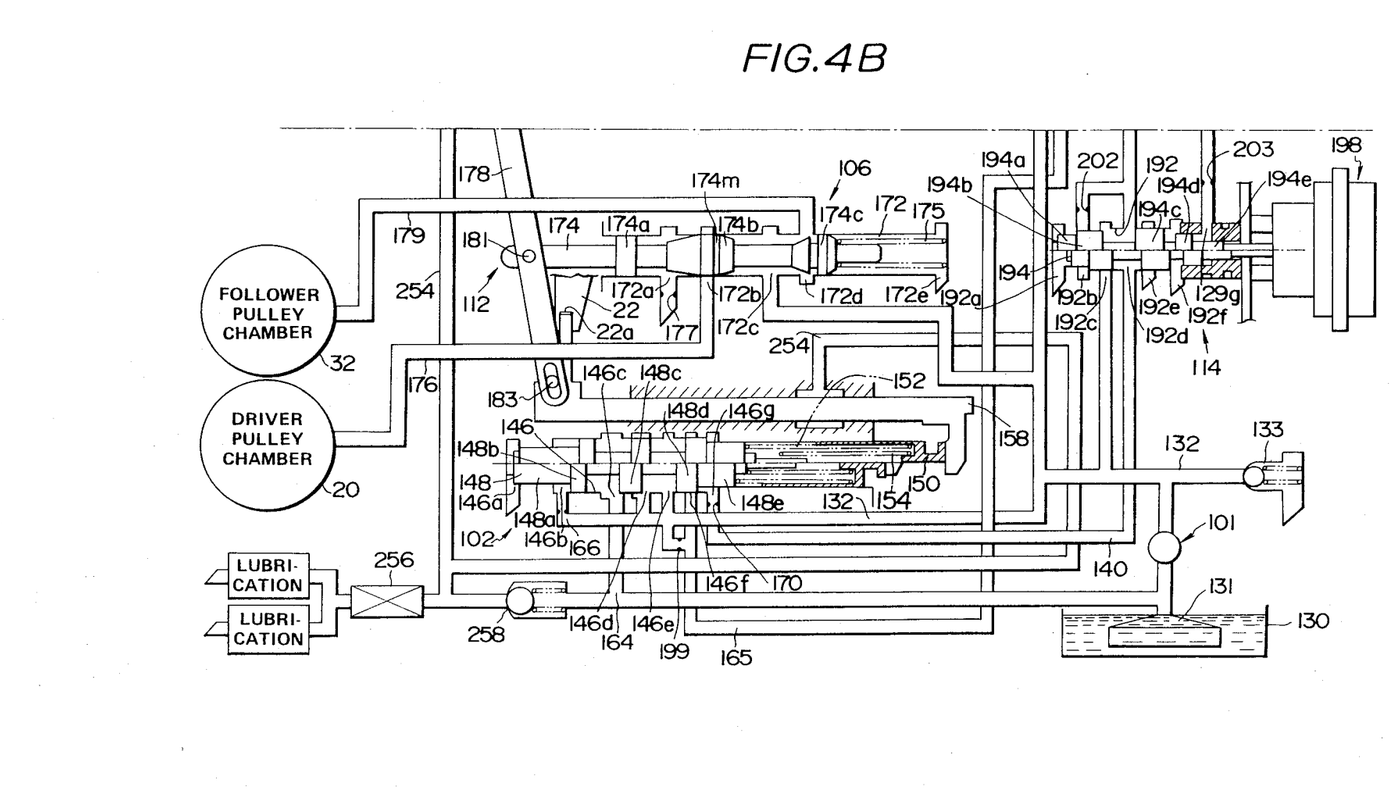

FIG. 4A and 4B shows a hydraulic pressure control system for the power transmitting mechanism of FIG. 3. This hydraulic control system has a fluid pump 101, a line pressure regulator valve 102, a manual valve 104, a shift control valve 106 an adjustment pressure change-over valve 108, a shift motor (, or step motor,) 110, a shift operation mechanism 112, a throttle valve 114, a constant pressure regulator valve 116, an electromagnetic valve 118, a coupling pressure regulator valve 120, a lock-up control valve 122 and so forth. These members of the hydraulic system are connected with the forward clutch 40, reverse brake 50, fluid coupling 12, lock-up chamber 12a, driver pulley cylinder chamber 20 and follower pulley cylinder chamber 32, as shown in FIGS. 4A and 4B. This hydraulic system is also disclosed in the above-mentioned U.S. application Ser. No. 792,422, and European application No. 85 113 788.5 whose disclosure is hereby incorporated by reference. The following is a list of component parts of the hydraulic system shown in FIGS. 4A and 4B. Pinion gear 110a, tank 130, strainer 131, fluid line 132, relief valve 133, valve bore 134, ports 134a–134e, spool 136, lands 136a–136b, fluid line 138, one-way orifice 139, fluid lines 140 and 142, one-way orifice 143, valve bore 146, ports 146a–146g, spool 148, lands 148a–148e, sleeve 150, springs 152 and 154, bias member 158, fluid lines 164 and 165, orifices 166 and 170, valve bore 172, ports 172a–172e, spool 174, lands 174a–174c, spring 175, fluid line 176, orifice 177, lever 178, fluid line 179, pin 181, rod 182, lands 182a and 182b, rack 182c, pins 183 and 185, valve bore 186, ports 186a–186d, fluid lines 188, 189 and 190, valve bore 192, ports 192a–192g, spool 194, lands 194a–194e, vacuum diaphragm 198, orifices 199, 202 and 203, valve bore 204, ports 204a–204e, spool 206, lands 206a–206b, spring 208, fluid line 209, filter 211, orifice 216, port 222, solenoid 224, plunger 224a, spring 225, valve bore 230, ports 230a–230e, spool 232, lands 232a–232b, spring 234, fluid line 235, orifice 236, valve bore 240, ports 240a–240h, spool 242, lands 242a–242e, fluid lines 243 and 245, orifices 246, 247, 248, 249, choke-type throttle valve 250, relief valve 251, choke-type throttle valve 252, pressure maintaining valve 253, fluid line 254, cooler 256, cooler pressure maintaining valve 258, orifice 259, and change-over detecting switch 278.

The shift control valve 106 has a valve body formed with the valve bore 172, the spool 174 received in the valve bore 172, and a spring 175 biasing the spool 174 to the left as viewed in FIG. 4B. The valve bore 172 has five ports 172a, 172b, 172c, 172d and 172e. The spool 174 has three lands 174a, 174b and 174c. The port 172a and 172e are drain ports. The port 172b is in fluid communication with the driver pulley cylinder chamber 20 via the line 176. The port 172d is in fluid communication with the follower pulley cylinder chamber 32 via the line 179. The port 172c is supplied with the line pressure via the line 132. The ports 172b, 172c and 172a are referred to as first, second and third ports, respectively, hereinbelow. The spool 174 is moved axially by the shift motor 110 through the rod 182 and lever 178. However, it is optional to arrange so that the spool 174 is moved by a hydraulic means instead of using an electric motor.

Figure 1:
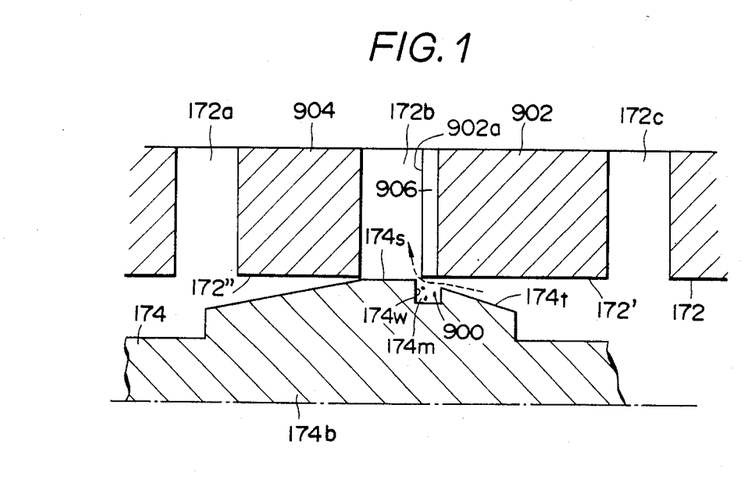
FIG. 1 is an enlarged sectional view of a control valve of a first embodiment of the present invention.
Figure 2:
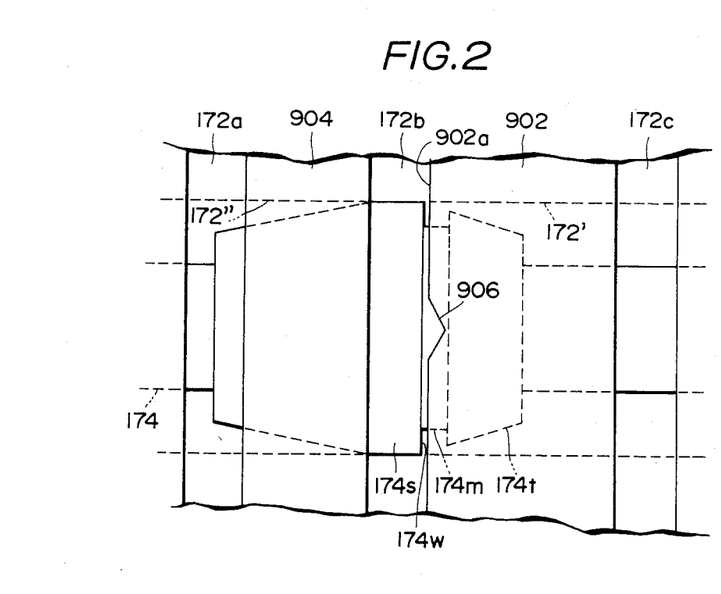
FIG. 2 is fragmentary view of the control valve of FIG. 1 as viewed from above in FIG. 1.

FIGS. 1 and 2 show the land 174b and its vicinity of the shift control valve 106. (Although in FIGS. 1 and 2, the present invention is applied to the land 174b and its vicinity, the present invention is also applicable to the land 174c and its vicinity of the control valve 106.)

A circumferential annular groove 174m is formed in the land 174b of the spool 174 of the shift control valve 106. The land 174b of the spool 174 has a cylindrical spool section 174s having the shape of a right circular cylinder, and a conical taper section 174t having the shape of a frustum of cone. The circumferential groove 174m is formed between the cylindrical and conical sections 174s and 174t. In this embodiment, the circumferential groove 174m has a rectangular cross section, and a side face 174w constituting the boundary between the cylindrical section 174s and the circumferential groove 174m is substantially flat and perpendicular to the axis of spool 174. As mentioned before, the first port 172b is in fluid communication with the driver pulley cylinder chamber 20 which serves as a hydraulic actuator. The first port 172b is formed around the valve bore 172 between a first wall section 902 and a second wall section 904 of the valve body of the shift control valve 106. The first wall section 902 is situated between the first port 172b and the second port 172c which receives the fluid pressure (line pressure) of the fluid pressure source. The second wall section 904 is situated between the first port 172b and the third port 172a for drain. The valve bore 172 has a first bore section 172' defined by the first wall section 902, and a second bore section 172'' defined by the second wall section 904. The first bore section 172' is supplied with the fluid pressure from the second port 172c. The second bore section 172'' is drained through the third port 172a.

The first wall section 902 has a first side face 902a which constitutes the boundary between the first wall section 902 and the first port 172b. The first side face 902a is formed with a radial groove 906 having a predetermined depth. In this embodiment, the first side face 902a of the first wall section 902 is substantially flat and perpendicular to the axis of the spool 174, as shown in FIGS. 1 and 2. The first port 172b is bounded between the first side face 902a and a left plane which is parallel to the first side face 902a and lies on the left side of the first side face 902a as viewed in FIGS. 1 and 2. The radial groove 906 lies between the plane of the first side face 902a, and a right plane which is parallel to the first side face 902a and lies on the right side of the first side face 902a as viewed in FIGS. 1 and 2. The bottom of the radial groove 906 lies on the right plane. In this embodiment, the radial groove 906 has a V-shaped cross section as shown in FIG. 2. The line pressure supplied through the fluid line 132 and the second port 172c into the first valve bore section 172' flows through a narrow space between the outwardly facing conical surface of the conical spool section 174t and the inwardly facing cylindrical surface of the first wall section 902, into the first port 172b, as shown by an arrow of a broken line in FIG. 1. From the first port 172b, the fluid pressure further flows through the fluid line 176 into the driver pulley cylinder chamber 20. A part of the fluid in the port 172b is drained through a space between the land 174b and the second wall section 904. During this, relatively large particles 900 of dust or the like suspended in the oil are prevented from passing through the narrowest section of the space between the first wall section 902 and the land 174b of the spool 174, and the particles 900 are collected in the circumferential groove 174m. If the spool 174 is moved rightwardly as viewed in FIG. 1 from the position of FIG. 1, the flow through the port 172b is more restricted, so that the transmission ratio of the transmission 29 is increased. In this case, the circumferential groove 174m of the present invention prevents the particles 900 from being caught in the space having a wedge-shaped sectional shape between the first wall section 902 and the conical spool section 174t, by serving as a shelter for the particles 900. Therefore, the circumferential groove 714m can prevent the spool 174 from being stuck in the valve bore 172 by the particles of dust even if many particles are suspended in the oil.

When the spool 174 is moved leftwardly as viewed in FIG. 1 to decrease the transmission ratio, the spool 174 reaches an axial position in which the circumferential groove 174m is fully open to the first port 172b and the oil flow rate thorough the first port 172b is increased. Therefore, the particles 900 which have been collected in the circumferential groove 174m are swept away, so that the collection of the particles 900 in the circumferential groove 174m can not become too much.

Figure 5:
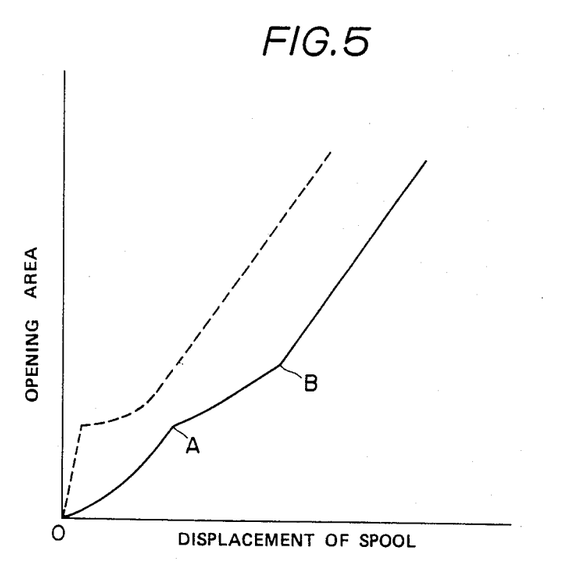
FIG. 5 is a diagram showing a relationship between the area of an opening of the control valve of FIG. 1 and the axial displacement of a spool of the valve.
Figure 6:
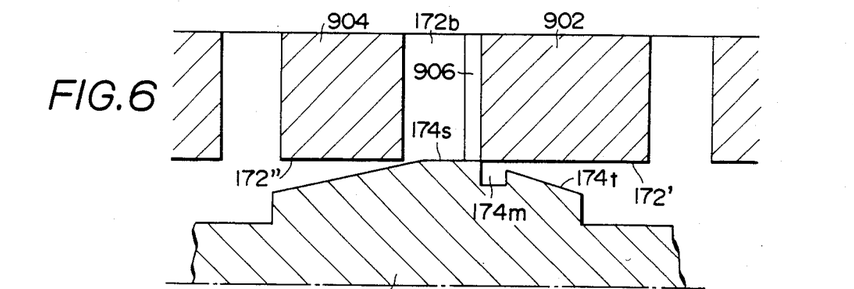
FIGS. 6, 7 and 8 are sectional views similar to FIG. 1, but showing different axial positions of the spool corresponding to points O, A and B of FIG. 5.
Figure 7:
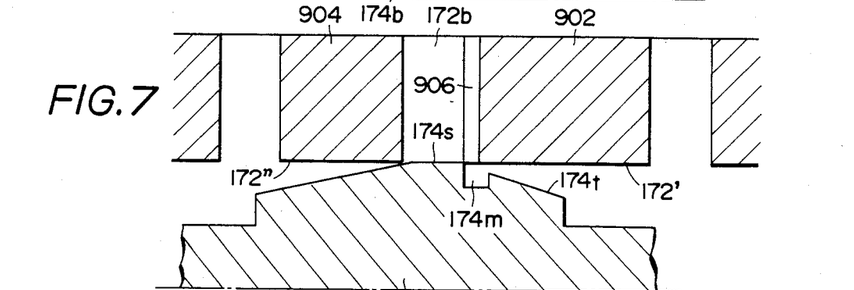
Figure 8:
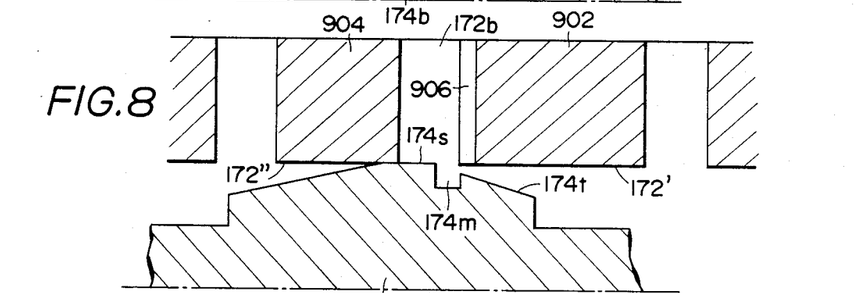

The radial groove 906 of the first wall section 902 serves to prevent an abrupt change in opening size of the valve. The area of the open clearance between the land 174b and the first wall section 902 increases with movement of the spool 174 as shown by a solid line in FIG. 5. In FIG. 5, the displacement of the spool 174 is equal to zero when the spool 174 is in a position shown in FIG. 6 in which the boundary between the cylindrical spool section 174s and the circumferential groove 174m is in alignment with the bottom of the radial groove 906 of the first wall section 902 (That is, the boundary lies on a plane perpendicular to the axis of the spool 174, passing through the bottom of the radial groove 906.). In FIG. 5, the abscissa(x-distance) expresses the amount of the displacement of the spool 174 in the leftward direction from the position of FIG. 6. When the spool 174 starts moving leftwardly from the position of FIG. 6, an opening area is first formed by the radial groove 906 of the first wall section 902. The opening area formed by the radial groove 906 is gradually increased with leftward movement of the spool 174 until a point A in FIG. 5 is reached at which the spool 174 reaches a position shown in FIG. 7. In the position of FIG. 7, the boundary between the cylindrical spool section 174s and the circumferential groove 174m is in alignment with the first side face 902a of the first wall section 902. With further leftward movement of the spool 174, the right end of the cylindrical spool section 174s moves away from the first wall section 902, and the fluid flow is throttled by the inwardly facing cylindrical surface of the first wall section 902 and the left end of the conical spool section 174t which bounds the circumferential groove 174m and at which the diameter of the conical shape is largest. During leftward movement of the spool 174 from the position of FIG. 7 to a position shown in FIG. 8 (corresponding to a point B in FIG. 5), the opening area is increased gradually because of existence of the radial groove 906. When the spool 174 further moves leftwardly from the position of FIG. 8, the opening area is increased by virtue of the shape of the conical spool section 174t tapering toward the right end. In this way, the characteristic shown by the solid line in FIG. 5 is obtained by the design of the first embodiment of the present invention. A broken line in FIG. 5 shows a characteristic of the opening area which would be obtained if there were not formed with the radial groove 906. In the case of the broken line, the opening area is increased abruptly when the right end of the cylindrical spool section 174s leaves the first wall section 902. Then, the opening area remains substantially unchanged while the circumferential groove 174m is passing through the position of the first (left) side face 902a of the first wall section 902. Thereafter, the opening area is increased continuously. In the case of the broken line, the opening area is changed in such a steplike manner as to cause a step change in the fluid pressure. The valve design of the first embodiment can increase the opening area smoothly as shown by the solid line in FIG. 5, and prevent undesired hunting due to abrupt change in the fluid pressure.

Figure 9:
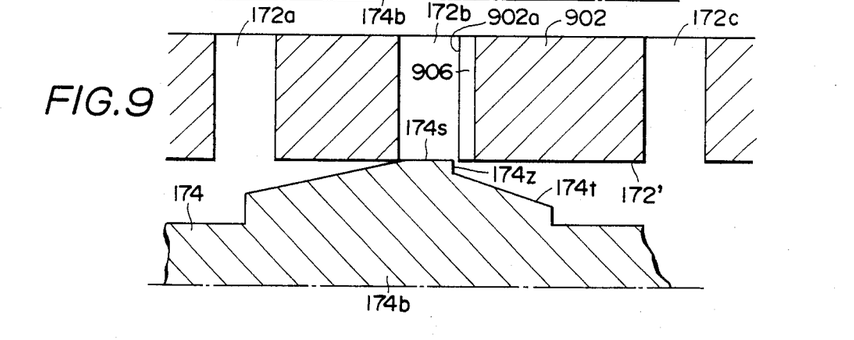
FIG. 9 is a sectional view showing a control valve of a second embodiment of the present invention.
Figure 10:
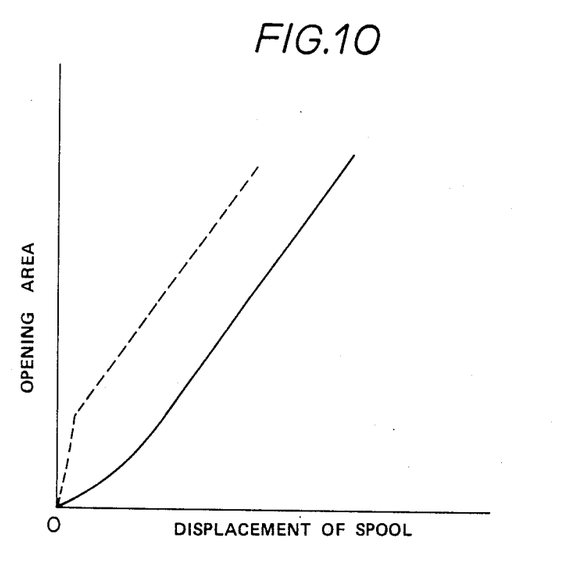
FIG. 10 is a diagram showing a relationship between the area of an opening of the control valve of FIG. 9 and the axial displacement of the spool.

A second embodiment of the present invention is shown in FIGS. 9 and 10. In the second embodiment, a circumferential step surface 174z is formed between the cylindrical spool section 174s and the conical taper section 174t instead of the circumferential groove 174m. The circumferential step surface 174z faces in an upstream direction from the first port 172b toward the second port 172c (rightward as viewed in FIG. 9). In this embodiment, the step surface 174z is substantially perpendicular to the axis of the spool 174 and bounded between two concentric circles. The step surface 174z of the second embodiment prevents the particles of dust from being involved in the wedge-shaped space between the first wall section 902 and the conical section 174t by pushing back the particles. The radial groove 906 is formed in the same manner as in the first embodiment. FIG. 10 shows a characteristic of the opening area obtained by the second embodiment. A broken line in FIG. 10 shows a characteristic obtained by eliminating the radial groove 906. The radial groove 906 of the present invention can prevent an abrupt change in the opening area as shown by the solid line in FIG. 10. The line segment AB of FIG. 5 is eliminated in FIG. 10 because the circumferential groove 174m is replaced by the step surface 174z. As soon as the step surface 174z has passed through the position of the left end 906a of the first wall section 906, the opening area is increased by virtue of the shape of the conical section 174 in accordance with the displacement of the spool 174. Therefore, the sensitivity of change in opening area with respect to change in displacement of the spool is improved, as compared with the first embodiment.

What is claimed is:

1. A control valve for a hydraulic actuator, comprising;

a valve body having at least first and second wall sections, a valve bore passing through said first and second wall sections, a first fluid port formed between said first and second wall sections for conveying a fluid from said valve bore toward said hydraulic actuator, a second fluid port for receiving the fluid from a fluid pressure source into said valve bore, and a third fluid port for draining the fluid from said valve bore, said first wall section being situated between said first and second ports, said second wall section being situated between said first and third ports, said first wall section having a first side face bounding said first port, said first side face of said first wall section being formed with a radial groove extending into said valve bore, and a spool slidably received in said valve bore of said valve body, said spool having at least a cylindrical spool section slidably fitted in said valve bore, a taper spool section which is situated on an upstream side of said cylindrical section in an upstream direction from said first port toward said second port and whose sectional area decreases gradually in said upstream direction, and trap means formed between said cylindrical section and said taper section for forming a step.

2. A control valve according to claim 1 wherein said taper spool section has a downstream end at which the sectional area of said taper section is maximum, said downstream end of said taper section being circumscribed by a circle whose diameter is smaller than a diameter of said cylindrical spool section, said trap means comprising a trap annular face facing toward said taper section.

3. A control valve according to claim 2 wherein said taper section has a circular conical surface.

4. A control valve according to claim 3 wherein said cylindrical spool section having an axial length approximately equal to a space between said first and second wall sections.

5. A control valve according to claim 4 wherein said trap face bounds said cylindrical spool section.

6. A control valve according to claim 5 wherein said trap means is a circumferential groove.

7. A control valve according to claim 5 wherein said trap face extending radially inwardly from a periphery of an upstream end of said cylindrical section to a periphery of said downstream end of said taper section.

* * * * *